United States Patent
Matsuyama

(10) Patent No.: US 6,506,997 B2
(45) Date of Patent: Jan. 14, 2003

(54) SPOT WELDING SYSTEM AND METHOD FOR SENSING WELDING CONDITIONS IN REAL TIME

(75) Inventor: Kin-ichi Matsuyama, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 17 days.

(21) Appl. No.: 09/900,572

(22) Filed: Jul. 6, 2001

(65) Prior Publication Data

US 2002/0053555 A1 May 9, 2002

Related U.S. Application Data

(60) Provisional application No. 60/234,395, filed on Sep. 21, 2000.

(51) Int. Cl.[7] .............................................. B23K 11/25
(52) U.S. Cl. ...................................... 219/110; 219/109
(58) Field of Search .................................. 219/109, 110

(56) References Cited

U.S. PATENT DOCUMENTS

| | | | |
|---|---|---|---|
| 4,596,917 A | | 6/1986 | Nied et al. |
| 4,861,960 A | | 8/1989 | Haefner et al. |
| 5,343,011 A | * | 8/1994 | Fujii et al. .................. 219/109 |
| 5,892,197 A | | 4/1999 | Goto et al. |
| 6,043,449 A | | 3/2000 | Kanjo |
| 6,064,029 A | | 5/2000 | Choi et al. |

FOREIGN PATENT DOCUMENTS

| | | |
|---|---|---|
| JP | 05228647 | 9/1993 |
| JP | 06106362 | 4/1994 |
| JP | 09094673 | 4/1997 |
| JP | 09216072 | 8/1997 |
| JP | 11010356 | 1/1999 |
| JP | 2000079482 | 3/2000 |
| JP | 2000126872 | 5/2000 |
| WO | WO 00/59672 | 10/2000 |

OTHER PUBLICATIONS

Boomer, R. Douglas et al. "On Line Nugget Expulsion Detection for Aluminium Spot Welding and Weldbonding", SAE 1996 Transactions Journal of Materials & Manufacturing. vol. 105 Section 5, 1996, pp.209–218.

Fong, Max et al. "Development of the Law of Thermal Similarity (Lots) for Low–Indentation Cosmetic Resistance Welds", International Sheet Metal Welding Conference IX, Oct. 20, 2000, pp. 1–10.

Herold, H. et al. "New Joining Technique Using Resistance Spot Welding", Welding International No. 1, 1989, pp. 69–71.

Livshits, A.G. "Universal Quality Assurance Method for Resistance Spot Welding Based on Dynamic Resistance", Welding Journal, vol. 76 Sep. 1997, pp. 383–s–390–s.

Matsuyama, K. "Real Time Visualization Welding State in Spot Welding", Ninth International Conference on Computer Technology in Welding, 1999, pp. 3–14.

Matsuyama, Kin–ichi, "Nugget Size Sensing of Spot Weld based on Neural Network Learning", Reprint from the preprint for 7th International Conference on Computer Technology in Welding, Annual Meeting of IIW in San Francisco, Doc. No. III–1081–97, Jul. 1997, pp. 1–10.

(List continued on next page.)

*Primary Examiner*—Clifford C. Shaw
(74) *Attorney, Agent, or Firm*—Daly, Crowley & Mofford, LLP

(57) ABSTRACT

Methods and apparatus are provided for monitoring resistance spot welding process conditions in real time by using welding data in an energy balance model in integral form to estimate the mean weld temperature and to predict process conditions such as occurrence of splash, and weld diameter. Using predicted welding process conditions, welding parameters are modified in real time to prevent splash and produce sound welds.

26 Claims, 10 Drawing Sheets

OTHER PUBLICATIONS

Matsuyama, Kin–Ichi. "Procedure for Reducing the Solution Time by Using Numerical Simulation Techniques for the Measurement of Weld Nugget Diameter", I.I.W. in Beijing Doc. No. III–1028–94, Sep. 1994, pp. 1–12.

Messler, Robert W. "Review of Control Systems for Resistance Spot Welding: Past and Current Practices and Emerging Trends", Science and Technology of Welding and Joining, vol. 1, No. 1 1996, pp. 1–10.

Monari, G. et al. "Prediction of Spot Welding Diameter Using Neural Networks", IIW, 1998, Doc. 111–1108–98, pp. 2–13.

Nishiguchi, Kimiyuki et al. "Influence of Current Wave Form on Nugget Formation Phenomena When Spot Welding Thin Steel Sheet", Welding in the World, vol.25 No.11/12, 1987, pp. 222–245.

Tsai, C.L. et al. "Analysis and Development of a Real—Time Control Methodology in Resistance Spot Welding", Welding Journal vol. 70, 1991, pp.339–s–3351–s.

Zhang, Hongyan et al. "Expulsion Modeling in RSW of Steel and Aluminum Alloys", AWS Sheet Metal Welding Conference VIII, 1998, pp. 1–15.

Zhang, Hongyan et al. "A Statistical Analysis of Expulsion Limits in Resistance Spot Welding", Journal of Manufacturing Science and Engineering, vol. 122, Aug. 2000, pp.501–510.

Li, Wei et al., "On–Line Quality Estimation in Resistance Spot Welding", Journal of Manufacturing Science and Engineering, vol. 122,Aug. 2000, pp.511–512.

175 Pages of MIT Technology Licensing Office Search, Mar. 21, 2001.

Matsuyama, Kin–ichi et al. "A Study of Splashing Mechanism in Resistance Spot Welding", Proc. Of Sheet Metal Welding Conference IX Cordinating by AWS. Oct., 2000, pp. 1–12.

L. M. Galantucci, "Computer–aided design for flash welds", Welding International, vol. 8, No. 3, 1994, pp. 195–204.

Copy of International Search Report dated Feb. 25, 2002 International Application No. PCT/US01/21402.

* cited by examiner

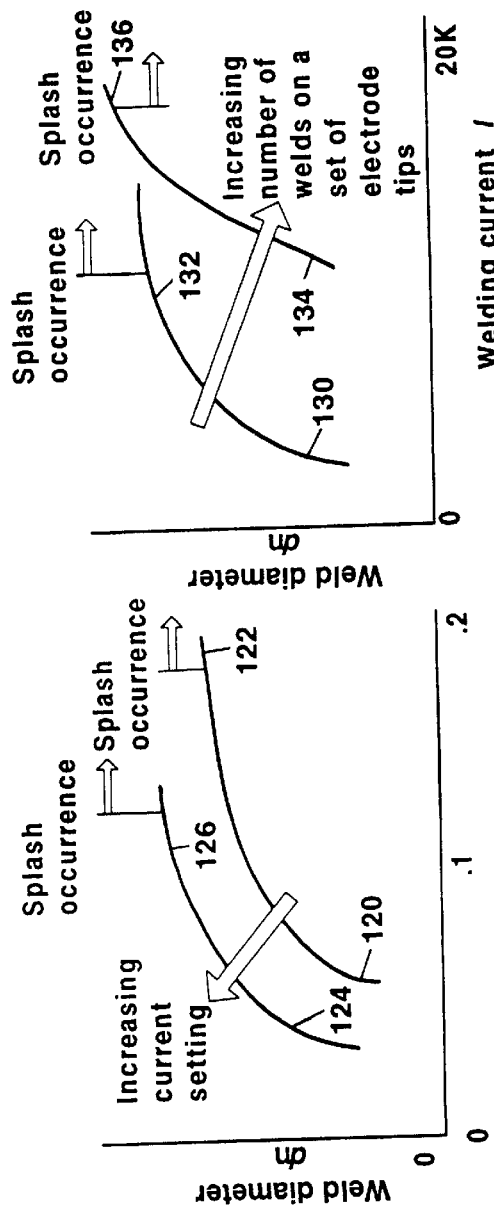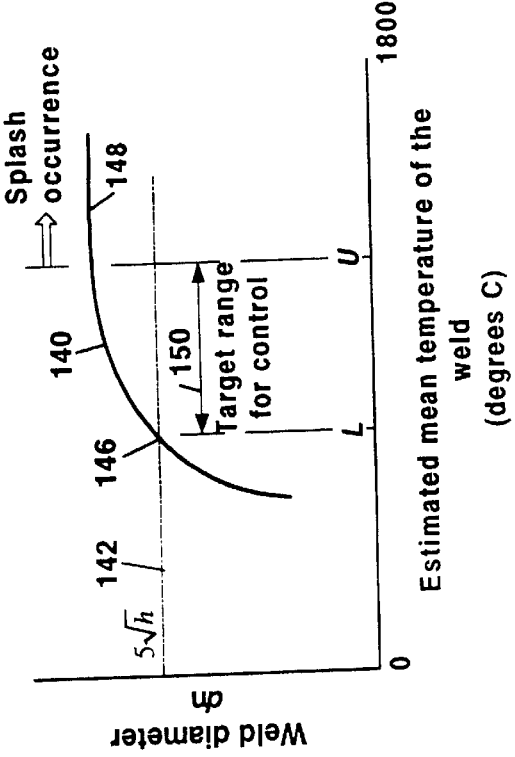

SPOT WELDING SYSTEM AND METHOD FOR SENSING WELDING CONDITIONS IN REAL TIME

RELATED APPLICATIONS

This application claims priority under 35 U.S.C. § 119(e) from U.S. Provisional Application No. 60/234,395 filed on Sep. 21, 2000, which is hereby incorporated herein by reference in its entirety.

FIELD OF THE INVENTION

This invention relates generally to resistance spot welding and more particularly to a method and apparatus to sense welding conditions, calculate energy balance, predict weld diameter, and eliminate splash.

BACKGROUND OF THE INVENTION

Resistance spot welding is a process for joining sheet metal components that involves clamping two or more parts together between two electrodes and passing a series of low voltage, high current pulses through the parts. The parts are squeezed together in an area between the electrodes and heated by the high current pulses. The material between the electrodes melts forming a molten area known as a nugget. When the current is switched off, the nugget of molten material solidifies forming a joint which is referred to as a weld. Frequently during resistance spot welding, an expulsion of the molten material occurs when the parts to be welded, generally referred to as weldments, plates or workpieces, are momentarily overheated. The expulsion of molten material, conventionally referred to as splash, is detrimental because it creates a hazardous working environment and it also creates a weaker weld. Splash caused by overheating has been attributed to sudden melting of a portion of the corona bond zone at the faying surface interface (i.e. the contacting surface of parts to be joined). Continuous monitoring and prediction of nugget temperature including the dynamic behavior of the rise in temperature, is important for predicting splash caused by overheating.

For example, the temperature pattern of a weld can be continuously simulated by a system implementing a monitoring procedure based on a numerical simulation of the workpiece temperature. Prior art simulations have been used to estimate certain welding phenomena including current distribution, temperature spatial distribution, and temperature profile as a function of time. Such systems require welding current data, welding voltage data, and information concerning physical properties of the workpiece as inputs to the simulation.

However, these prior art simulations are not used as real time prediction tools, since the calculation time required to predict temperature profiles is several orders of magnitude longer than the actual welding time. Thus, although such systems are useful for determining weld diameter and temperature profiles of welds, these systems have not been used in feedback control systems for the elimination of splash.

A heat conductance distribution is used to estimate temperature profiles. Some prior art systems compute the heat conductance distribution using differential equations and finite element analysis methods that require time consuming calculations. The prior art methods require a large number of mesh points which are mathematical point approximations of a continuous volume used to calculate accurate temperature patterns and temperature profiles. Finite difference methods and finite boundary methods are similarly computationally intensive.

Some prior art resistance spot welding systems use displacement of the electrode tips to monitor the welding process. These techniques require further instrumentation of the welding systems to accurately measure electrode tip displacement and complex statistical models and regression analysis to estimate nugget diameter. U.S. Pat. No. 6,043,449 discloses a method to estimate nugget diameter based on inter-electrode distance. A system using electrode displacement measurements cannot correctly determine weld diameter when the weld is formed near a workpiece edge due to the typical deformation of the edge of the workpiece.

Other prior art resistance spot welding systems use a finite element temperature analysis to predict temperature distribution and nugget growth. These prior art systems typically do not run in real time and require a processing capability generally not found in spot welding systems. For example, U.S. Pat. No. 5,892,197 discloses a nugget growth predicting means based on energy distribution calculations using a 3-D micro-lattice model to estimate energy distribution. A very high performance work station, special purpose digital signal processor (DSP) hardware, or small supercomputer would be required to solve the 3-D micro-lattice model in real time whereas the typical resistance spot welding controller has the processing power of a slow personal computer.

Other techniques have been developed for monitoring weld quality based on a one-dimensional thermal equation and analog dynamic model of neural networks. However, these techniques use a thermal equation without considering the importance of plate or part thickness. Some of these techniques are described in "Nugget Size Sensing of Spot Weld based on Neural Network Learning," Kin-ichi Matsuyama, 7$^{th}$ International Conference on Computer technology in Welding, Proceedings of the IIW Doc. III-1081-97, July, 1997, and "Prediction of Spot Welding Diameter Using Neural Networks, Monari et al., Proceedings of the IIW Doc. III-1108-98, 1998. Several systems have also been developed to detect splash, but these systems cannot predict the future occurrence of splash.

As is known in the art, a thermal similarity rule developed by Okuda, as described in "Resistance spot welding of thick steels," (Report 1), Welding Technology, 19 (1971), pp 104–107, can explain the governing parameters of nugget formation in resistance spot welding. This rule is derived from the non-dimensional expression of the thermal conduction equation. The rule, however, cannot explain the relationships between ordinary welding conditions and welding results since the rule holds only in special cases, in which the electrode tip diameter is exactly proportional to the plate thickness. Under actual welding conditions, the electrode tip diameter is usually not exactly proportional to the plate thickness as recommended for resistance spot welding. Therefore, the thermal similarity rule described above cannot be used to predict the temperature profile under typical operating conditions.

The Resistance Welders Manufacturer's Association (RWMA) recommends that an electrode tip diameter should be five times the square root of the plate thickness. This suggested electrode tip diameter results from empirical data.

Other techniques have been developed for monitoring weld quality based on a one dimensional thermal equation and feed forward model of neural networks. The procedure based on the one dimensional thermal equation has been successfully applied to monitor weld quality, but the system requires a high speed DSP to provide real time control. The neural network solutions require a large amount of data for training, and the solutions are not applicable for any welding condition out of a trained zone because the underlying model is determined experimentally rather than theoretically. As a result neural networks are not widely used in the installed base of resistance spot welding systems.

There are several hundred thousand resistance spot welding systems in operation with a limited computational capacity. The total number of spot welding machines may be more than several million worldwide. It would be very expensive to replace even a relatively small number of resistance spot welding machines installed in automotive company manufacturing plants with controllers having real time monitoring because of the capital expense, installation costs, labor to reprogram the new controllers, and the factory downtime.

SUMMARY OF THE INVENTION

It is an object of the present invention to provide methods to predict weld diameter, to eliminate splash and to assure a sound weld. It is a further object of the present invention to implement the methods on an installed base of controllers without significant or even any welding machine hardware modifications or the addition of processing capability.

It is a still further object of the present invention to provide such a method for real time use during the welding process and in applications in which the electrode tip diameter is not exactly proportional to the plate thickness.

These and other objects of the invention are achieved by a method for monitoring resistance spot welding process conditions including the steps of monitoring at least one welding parameter and computing an estimate of a mean temperature in a workpiece based on an energy balance model which includes welding parameters and a workpiece thickness. The method may include the further step of predicting a process condition such as the occurrence of splash, a weld diameter, a growth in the weld diameter, and an electrode contact diameter. With this arrangement, an efficient technique for estimating the mean temperature is provided and can be used to predict and adaptively control welding process conditions.

In accordance with a further aspect of the present invention, a method for computing a real time estimate of the electrode contact diameter includes calculating a plate-electrode interface diameter based on a resistance value a resistivity of the workpiece, the total workpiece thickness, and the current density correction factor. Such an arrangement provides an indication of required machine maintenance and a more accurate estimation of welding process conditions over the life of a set of electrode tips.

In accordance with a further aspect of the present invention, a resistance spot welding controller includes a welding data processor coupled to an integral energy balance processor. With this particular arrangement, a controller can measure welding parameters in real time, and efficiently calculate the energy balance in a target volume in the workpiece during spot welding. The discrete form of the energy balance model provides a set of calculations that can be incorporated into the welding machine controllers of a large number of installed spot welding systems without the addition of increased processing power.

With the addition of a temperature prediction processor, a nugget diameter prediction processor, and a splash prediction processor it is possible to predict the possible occurrence of splash and predict the weld diameter. By adjusting the welding parameters in response to information provided by the nugget diameter prediction processor and temperature prediction processor, an adaptive control processor modifies at least one of welding current, welding time, and electrode force to prevent splash and assure adequate nugget diameter formation. It should be appreciated that processors are described as separate and distinct processors, in practice the functions performed by these may be performed by a single processor or by more than one processor.

In accordance with a still further aspect of the present invention, a resistance spot welding system having a spot welding machine with a power control unit and force control unit further includes a welding data processor coupled to receive input data from the welding machine and to compute a mean temperature estimate based on an energy balance model such that process conditions for the resistance spot welding system can be predicted. With this particular arrangement, a welding system can be improved with a capability for real time sensing, prediction and control of welding conditions.

In another embodiment, a discrete equation can predict of weld diameter in real time. In yet another embodiment the discrete equation can predict the occurrence of splash in real time in order to eliminate splash and provide for a total quality assurance system for spot welding.

The described energy balance model is used to provide equations which can be efficiently computed on an installed base of spot welding controllers, for example welding controllers or robot controllers, without adding special purpose digital signal processor (DSP) or additional high speed, central processing units (CPUs). As a result, the welding systems are provided with an improved capability for real time sensing and prediction of welding conditions.

The described system and techniques effectively eliminate the metal spatter in factories improving the working environment, and also provide information on weld diameter in real time. The weld diameter information can be used to ensure weld quality by allowing adaptive adjustment of welding conditions during the welding process. A prediction of the useful life of electrode tips based on an estimated electrode tip contact diameter provides an indication of required machine maintenance.

BRIEF DESCRIPTION OF THE DRAWINGS

The foregoing features of the invention, as well as the invention itself may be more fully understood from the following detailed description of the drawings, in which:

FIG. 4A is a graph showing the relationship between weld diameter and weld time for increasing current settings;

FIG. 4B is a graph showing the relationship between weld diameter and welding current for an increasing number of welds;

FIG. 4C is a graph showing the relationship between weld diameter and estimated mean temperature of a weld as predicted by the energy balance model of the present invention;

DESCRIPTION OF THE PREFERRED EMBODIENTS

Figure 1:
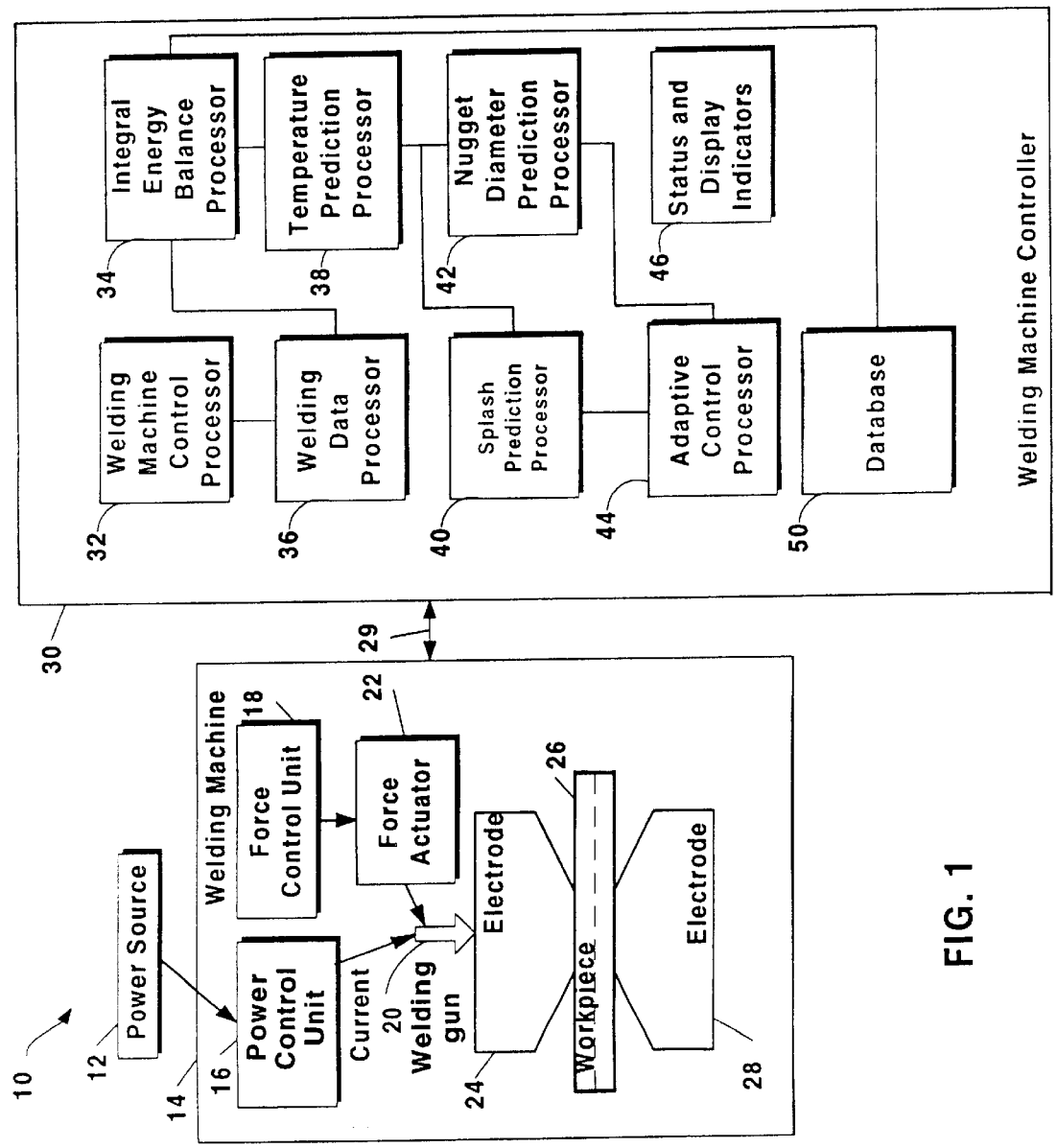
FIG. 1 is a block diagram of a welding system according to the present invention.

In the drawings, which are not necessarily to scale, like or corresponding parts are denoted by like or corresponding reference designations. The term electrode tip is used to describe an insert (typically copper) which is fitted into an electrode and which is in contact with or comes into contact with a workpiece during a welding operation.

Referring to FIG. 1, a welding system 10 includes a power source 12 connected to a power control unit 16 of a resistance spot welding machine 14 (referred to as welding machine 14). The welding machine 14 includes a welding gun 20 having a force actuator 22 which is coupled to a force control unit 18. The welding gun 20 includes a first electrode 24 and a second electrode 28 which are electrically connected to the power control unit 16. A weldment or workpiece 26 is held or otherwise disposed between the first electrode 24 and the second electrode 28.

A welding machine controller 30 is connected to the welding machine 14 by control and data signal lines 29. The welding machine controller 30 includes a welding data processor 36 that is coupled to a welding machine control processor 32 and an integral energy balance processor 34. The welding machine controller 30 further includes a temperature prediction processor 38 coupled to the integral energy balance processor 34. The temperature prediction processor 38 is coupled to a nugget diameter prediction processor 42 and a splash prediction processor 40, which is further coupled to an adaptive control processor 44, as shown. The welding machine controller 30 further includes status and display indicators 46 coupled to the processors 32–44. The welding machine controller 30 can include an optional database 50 coupled to the integral energy balance processor 34.

In operation, electrical power typically in the form of an alternating current is delivered from the power source 12 to the power control unit 16 to generate low voltage, high current power which is delivered to the workpiece 26 through the electrodes 24 and 28. The welding machine controller 30 controls power control unit 16 and the force control unit 18 which causes the force actuator 22, in the welding gun 20, to advance the welding electrode 24 against the workpiece 26 (as shown in more detail in FIG. 2). It will be appreciated by those of ordinary skill in the art that the force can be applied pneumatically with an air cylinder, electrically with an electric servo gun, or hydraulically.

The welding machine controller 30 monitors and controls the welding process by means of the welding machine control processor 32 which controls a series of welding cycles. The welding process typically includes several welding cycles of alternating current passing through the workpiece 26. The total welding time is typically a function of the thickness of the workpiece 26. The welding data processor 36 digitizes analog signals provided by the welding machine. In response to the digitized data from the welding data processor 36, including the current passing through electrodes 24 and 28 and the workpiece 26 and the voltage across electrodes 24 and 28, the welding machine control processor 32 controls the welding process by adjusting control and data signals provided to the power control unit 16 and the force control unit 18. The welding machine controller 30 can additionally monitor the force applied to the electrodes 24 and 28 and the thickness of the workpiece 26 measured by the movement of electrodes 24 and 28. The database 50, a manufacturing control system, or an operator supplies data to the welding machine control processor 32 and the integral energy balance processor 34 including the plate thickness, stack condition (i.e. the number and configuration of plates of the workpiece) and type of materials to be welded.

During intervals in the welding operation, the energy balance processor 34 calculates the amount of energy supplied to a volume between the electrodes 24 and 28. This volume is referred to as the "target volume" as described below in conjunction with FIG. 3A. The energy is supplied by the welding current which produces resistance heating as it flows through the electrodes 24 and 28 and the workpiece 26. The energy balance processor 34 also calculates the amount of energy which is conducted away from the target volume into the workpiece 26 by thermal conduction. These calculations are referred to as the energy balance or the energy balance model of the welding operation and are described below in more detail in conjunction with FIG. 3A, FIG. 3B, and equations 1–9. The temperature prediction processor 38 uses the energy balance in the target volume to predict an estimated weld temperature. The temperature estimates are provided to the splash prediction processor 40 and the nugget diameter prediction processor 42. If an occurrence of splash is predicted by processor 40, the adaptive control processor 44 calculates a set of welding parameter adjustments. In response to the adjusted welding parameters provided by the adaptive control processor 44 or a signal from the splash prediction processor 40, the welding machine control processor 32 commands the welding machine 14 to adjust or halt the welding current or to modify the electrode force to reduce or in some cases prevent splash.

It will be appreciated by those of ordinary skill in the art that the welding machine controller 30 can be configured with all or a subset of the above-described processors in order to provide different functional capabilities. For example, a quality monitoring system would include the temperature prediction processor 38, nugget diameter prediction processor 42 and status and display indicators 46. A splash elimination system would additionally include the splash prediction processor 40. An adaptive control system would additionally include the adaptive control processor 44.

The blocks denoted "processors" can represent computer software instructions or groups of instructions. Such processing may be performed by a single processing apparatus which may, for example, be provided as part of welding control system as is the case for the processes of FIGS. 5A–5C. Alternatively, the processing blocks represent steps performed by functionally equivalent circuits such as a digital signal processor circuit or an application specific integrated circuit (ASIC).

Figure 2:
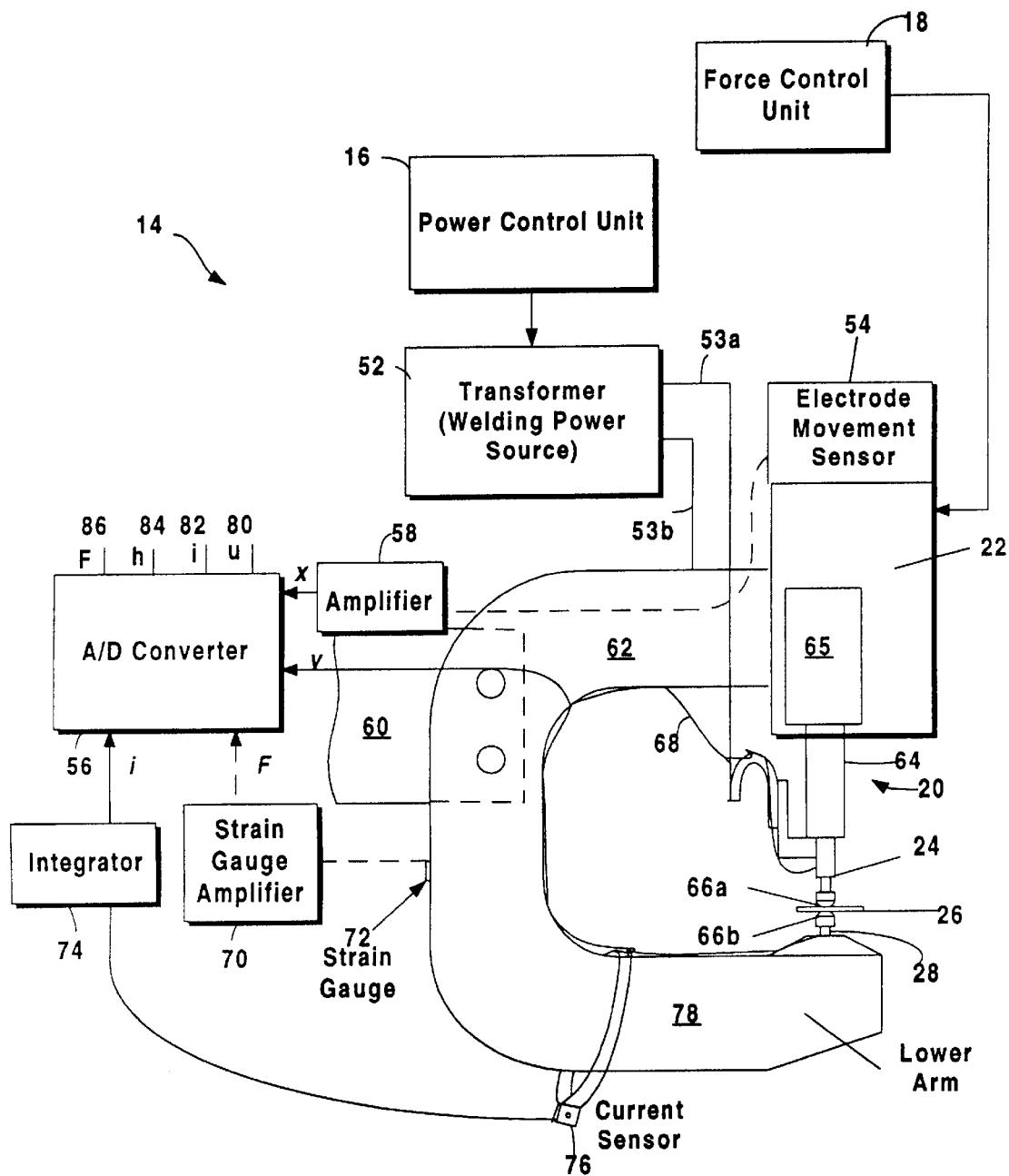
FIG. 2 is a diagram of the welding machine of FIG. 1.

Referring to FIG. 2, the welding machine 14 includes the welding gun 20 having a frame 62. Elements are shown schematically with like reference numbers referring to like elements of FIG. 1. The welding gun 20 includes the force actuator 22 coupled to force control unit 18 and mounted on the frame 62. A mounting bracket 60 can be attached to the frame 62 to allow the welding machine 14 to be mounted to a robot arm (not shown) or to a stationary fixture (not shown).

The force actuator 22 includes a piston/rod 64 movable within a cylinder 65. Electrode 24 is attached to the piston/rod 64 and is electrically connected to a first terminal 53a of a transformer 52 which receives power from the power control unit 16. A replaceable electrode tip 66a is mounted on and is in electrical contact with electrode 24. The frame 62 includes a lower frame arm 78. The second electrode 28 having a second electrode tip 66b is attached to the lower frame arm 78 on the side of the frame 62 opposite from the force actuator 22. The electrode tips 66a, 66b have a finite serviceable life of approximately 500 to as many as 10,000 welds depending on the welding conditions and the material to be welded. Over the tip lifetime, the contact diameter and electrical characteristics of tips 66a, 66b vary with the number of welds. The frame 62 is coupled to a second terminal 53b of the transformer 52. A current sensor 76 is mounted on the lower frame arm 78 to measure the welding current during welding. An optional strain gauge 72 can be mounted on frame 62 to measure the lower frame arm 78 deflection and the electrode force.

Additional elements of the welding machine 14 are provided to measure certain welding parameters and to provide welding parameter data to the welding data processor 36 (FIG. 1). In particular, current sensor 76 is coupled to an integrator 74. An electrode movement sensor 54 is coupled to an amplifier 58 and the optional strain gauge 72 is coupled to a strain gauge amplifier 70. The welding data processor 36 includes a multi-channel analog to digital converter (ADC) 56 with channels coupled to the electrode movement sensor amplifier 58, the current sensor integrator 74, the strain gauge amplifier 70 and the electrodes 24 and 28. It should be appreciated that the ADC 56, integrator 74, amplifier 58 and strain gauge amplifier 70 can independently be located in either the welding machine 14, or the welding controller 30 as shown.

The ADC 56 converts the voltage across electrodes 24 and 28 as measured with voltage pickup cables 68 connected to electrode holders (not shown) which are in electrical contact with the workpiece 26, into a digital signal 80 representing a measured welding voltage. The ADC 56 further converts the output of the integrator 74 into a digital signal 82 indicative of the measured welding current and the output of electrode movement sensor 54 into a digital signal 84 representing the instantaneous total workpiece thickness $h_t$. It will be appreciated by those of ordinary skill in the art that an approximation can be substituted for the instantaneous total workpiece thickness $h_t$ if an electrode movement sensor is not available. The electrode force, as measured by the optional strain gauge 72 or other force measurement device such as a load cell or optical diffraction device, can be converted into an digital output signal 86 representing a force applied to the workpiece 26. The outputs 80, 82, 84 and 86 of ADC 56 are coupled to the welding data processor 36 (FIG. 1).

Figure 3A:
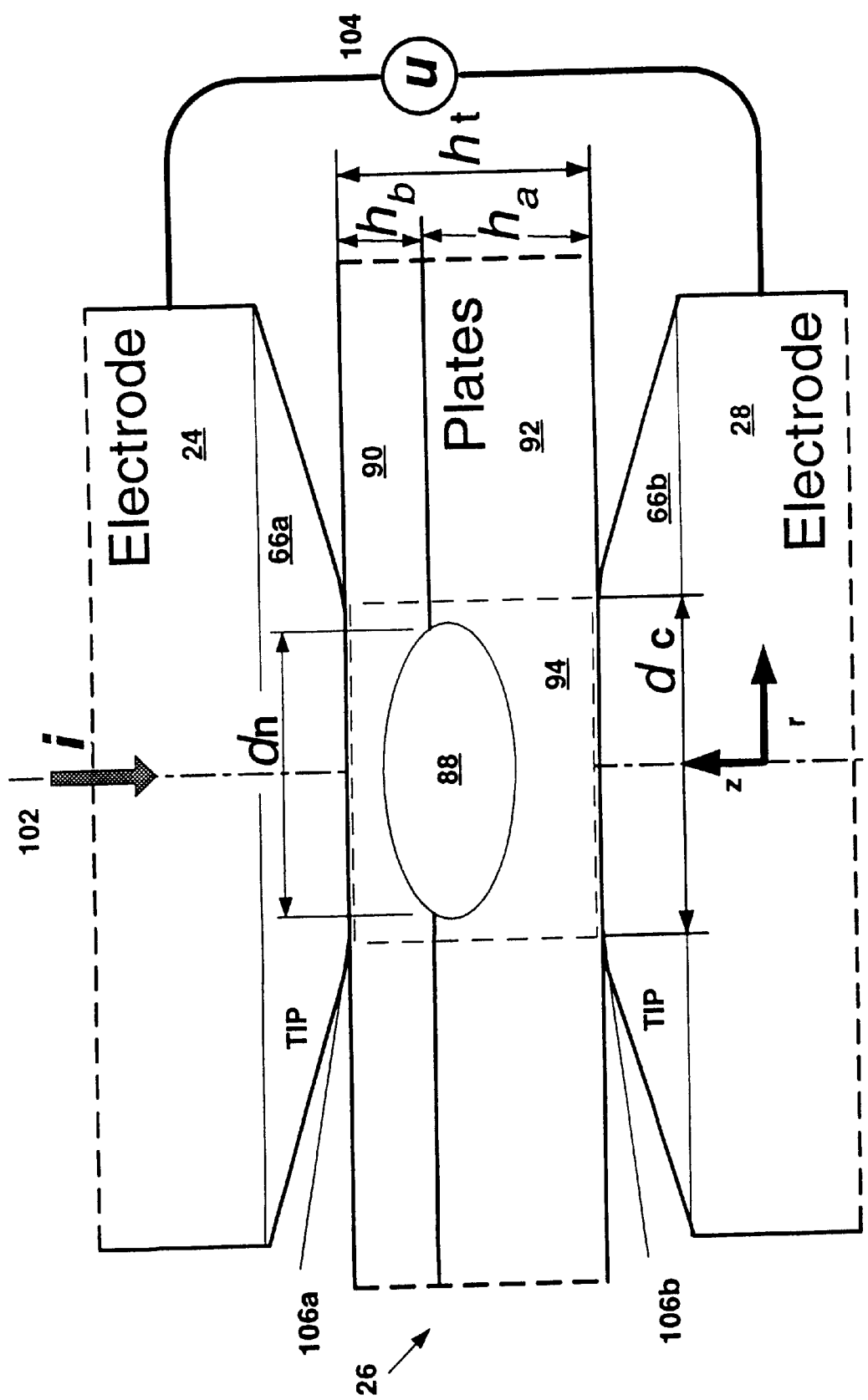
FIG. 3A is a schematic cross section of a set of electrodes, a workpiece, and the formation of a nugget including energy balance model parameters.

A welding operation includes a number of welding cycles in which typically several cycles of alternating current are passed through the workpiece 26 generating heat which forms a nugget or weld (as described in conjunction with FIG. 3A). The welding machine 14, including the power control unit 16 and force control unit 18, is generally controlled by the welding machine control processor 32 during the welding operation. In operation, the force control unit 18 supplies a signal to the electrode force actuator 22 to provide force on the workpiece 26 via the piston/rod 64 and electrode 24. More particularly, the force control unit 18 supplies a signal to the force actuator 22 which causes the first electrode 24 to advance toward the second electrode 28. This electrode movement holds the workpiece 26 between the two electrodes 24 and 28 by force. During each of several welding cycles, the power control unit 16 supplies a signal to the transformer 52 which allows controlled current to pass between electrodes 24 and 28 and through the workpiece 26. The welding current 82 is measured during the welding operation by current sensor 76, integrated by integrator 74, digitized by ADC 56 and provided to the welding data processor 36 (FIG. 1). The welding current 82 is used as a correction factor for a fringing effect caused by current density and for correcting the welding voltage 80 measurement. The welding voltage 80 is also digitized by the ADC 56 and provided to welding machine control processor 32 (FIG. 1) and used by the integral energy balance processor 34 to calculate the energy input into the target volume.

Now referring to FIG. 3A, a cross-sectional view of a workpiece during welding illustrates parameters used in the energy balance model. The workpiece 26 is held between electrode tip 66a mounted in electrode 24 and electrode tip 66b mounted in electrode 28 during the welding operation. In one embodiment, the workpiece 26 includes a plate 90 and a plate 92 which are to be welded together. Plate 90 and plate 92 are not required to be of equal thickness. Plate 90 has a thickness $h_b$ and plate 92 has a thickness $h_a$.

The total thickness of plates 90 and 92 is $h_t$. A nugget 88 having a width $d_n$ is formed at the interface between the plates 90 and 92 during welding. A set of physical properties of the weld at an arbitrary point in time is referred to as the welding state and can be represented as a mean temperature in a target volume 94 (also referred to as the mean weld temperature) in the workpiece 26. The target volume 94 is a volume under the electrode tips 66a and 66b in contact with the workpiece 26. Assuming the electrode tips 66a and 66b have a circular shape, the target volume 94 has a volume of $$\frac{\pi d_c^2}{4}(h_t),$$

where $d_c$ is the area of each electrode tip 66a, 66b in contact with the workpiece 26 at the respective electrode-workpiece interface 106a, 106b (also referred to a the plate-electrode interface). Preferably the tip contact area is circular and thus can be referred to as a contact diameter. However, it should be appreciated that the actual contact area is not perfectly circular and changes in size and shape occur over the life of the tips 66a and 66b. Thus, when the shape of the electrode varies from a circular shape, the above equation computes an approximate volume.

The welding current i 102 flows through the target volume 94. The voltage u 104 between the plates 90 and 92 is preferably measured between electrode 24 and electrode 28. The energy in the form of heat Q contained in the target volume 94 at a time t after starting current conduction is represented in a basic energy balance equation written in integral form as follows:

$$Q = \int_0^\tau \left( v \cdot i \cdot f(d/h) + 2K_e \frac{\partial T}{\partial z} \pi d^2 / 4 + \pi d h_t K \frac{\partial T}{\partial r} \right) d\tau \quad (1)$$

Where:

Q is the amount of heat contained in the target volume 94;

$\tau$ and t are time;

v is the voltage between plate surfaces, which is equivalent to the voltage between the electrodes 24 and 28 (which is the measured voltage u minus the voltage drops in tips 66a and 66b which are induced voltages by inductance due to the large current flow);

i is the welding current;

$K_e$ is the heat conductivity in the electrode tips 66a, 66b;

K is the heat conductivity in the workpiece;

d is the instantaneous contact diameter at the plate-electrode interface 106a, 106b at a time $\tau$, T is the temperature in the target volume 94 and is as a factor in the energy lost from the target volume 94;

$h_t$ is the total plate (workpiece 26) thickness;

f(d/h) is a current density correction factor to correct current fringing effects at the edges of the target volume 94, where h is the plate thickness of one plate, ($h_t$=2h where two plates have equal thickness, and if the plates have unequal thickness $h_a$ and $h_b$, the function is evaluated with an averaged value $f(d/h)=[h_a f(d/h_a)+h_b f(d/h_b)]/h_t$; $f(d/h)=\Sigma h_i f(d/h_i)/\Sigma h_i$ where $h_i$ is the thickness of an individual plate;

r is a radial direction as labeled in FIG. 3A; and z is a plate thickness direction as labeled in FIG. 3A.

The energy supplied to the target volume is represented by the v·i term in equation 1. The term which includes $K_e$ represents the heat loss in the z or plate thickness direction, and the term including K represents the heat loss in the r direction extending radially from an axis through the center of the nugget 88 and perpendicular to the plane of the workpiece 26 as shown in FIG. 3A. These terms represent a heat loss because both derivatives are negative.

Equation 1 is used in conjunction with Equations 2–9 to derive a set of equations 12a and 12b described below in conjunction with one embodiment of FIG. 5C. Equations 12a and 12b represent welding machine controller 30 control codes used to estimate the mean temperature every scanning cycle (referred to as interval I) which is the interval at which the welding parameters are sampled. The welding parameters are preferably sampled 2400 times per second which is equal to forty scans in a typical sixty Hz welding cycle.

A mean weld temperature $\overline{T}$ in the workpiece 26 is defined by the following equation:

$$\overline{T}(t) = \frac{Q}{h_t C \sigma \pi d_c^2 / 4} \quad (2)$$

Where C is the specific heat and $\sigma$ is the density of the workpiece 26 and $d_c$ is the diameter of an area of each electrode tip 66a and 66b in contact with the workpiece 26 and through which the current flows at time t. Note that $d_c$ is the actual contact diameters at the faying surface and the electrode-plate interfaces where tips 66a and 66b contact the workpiece 26, and these contact diameters increase during welding.

Thus, the following equation can be derived by substituting equation 1 for Q in equation 2:

$$\overline{T}(t) = \frac{4}{h_t C \sigma \pi d_c^2} \int_o^t \left\{ v \cdot i \cdot f(d/h) + \frac{\pi d^2 K_e}{2} \frac{\partial T}{\partial z} + \pi d h_t K \frac{\partial T}{\partial r} \right\} d\tau \quad (3)$$

Equation 3 is used predict the mean temperature profile in the target volume 94 as a function of welding time and energy input.

The following equation is combined with Equation 3 to eliminate the fringing effect function f(d/h) from equation 3, $$\frac{v}{i} = R = \frac{4 \rho h_t}{\pi d_c^2} f(d_c/h) \quad (4)$$

Where $$v = u - \sum R_e \cdot i - M \frac{di}{dt} \quad (5)$$

$\rho$ is the mean value of the resistivity of the weldment 26;

u is the voltage between electrode tips 66a and 66b;

$R_e$ is the resistance drop in each electrode tip; and

M is the mutual inductance between the welding current circuit and the voltage measuring circuit.

Furthermore, the contact diameter $d_c$ is predicted from equation 4 by the following:

$$d_c = \sqrt{\frac{4 \rho h_t}{\pi R} f(d_c/h)} \quad (5a)$$

where, the current density correction factor, function $f(d_c/h)$ is obtained from a lookup table.

Then, the following equation for the mean temperature in the target volume 94 can be derived from equations 3 and 4:

$$\overline{T}(t) = \frac{4}{C \sigma d_c^2} \int_o^t \left\{ \frac{v^2 d^2}{4 \rho h_t^2} + \frac{K_e d^2}{2 h_t} \frac{\partial T}{\partial z} + K d \frac{\partial T}{\partial r} \right\} d\tau \quad (6a)$$

Where, $d_c$ is the contact diameter at time t; and $d=d(\tau)$ is the actual instantaneous contact diameter as a function of time $\tau$.

Although the heat loss terms include the second and third terms in the right side of equation 6a, the heat loss is mainly governed by the second term which corresponds to heat loss from the electrode tips 66a and 66b. The heat loss from the electrode tips are proportional to the temperature at the electrode-plate interfaces 106a, 106b and the thermal conductivity of electrodes 24, 28 and corresponding tips 66a, 66b.

It will be appreciated by those of ordinary skill in the art that the energy balance model can be applied to workpiece 26 configurations which include more than two plates or sheets of material (referred to as an n-sheet stack). For example, if the temperature at the interface between electrode tip and plate, and the temperature gradient near the interface are the same in a two-sheet stack $X_0$ (the reference stack) having a total thickness ho and four-sheet stack $X_1$ of total thickness $h_t$, then the mean temperature for the four-sheet stack $X_1$ is calculated as product of the mean temperature for the reference stack $X_0$ and the ratio of total plate thickness ($ht/h_0$).

The heat loss terms are defined for a reference two-sheet stack, and mean temperature for a multi-sheet stack is calculated with the following equation:

$$\overline{T}(t) = \frac{4}{C\sigma d_c^2} \int_o^t \left\{ \frac{v^2 d^2}{4\rho h_t h_0} + \frac{K_e d^2}{2h_0} \frac{\partial T}{\partial z} + Kd \frac{\partial T}{\partial r} \right\} d\tau \qquad (6b)$$

Where the thickness $h_0$ is an initial total plate thickness which used at training to setup the parameters for the workpiece having two plates of equal thickness ($h_0=2h$). If $h_t=h_0$, equation 6b is equivalent to equation 6a. Equation 6b is used for calculation of the mean weld temperature in a variety of configurations (e.g. two-sheet stack configurations having plates with unequal thickness, two-sheet stack configurations having a total thickness differing from the reference thickness, and also for multi-stack configurations with plates having either equal or unequal thickness).

Equation 6b can be rewritten in discrete form as finite difference equation 7 because as determined empirically, the second and third terms can be assumed to be proportional to the first term.

$$\overline{T}(t+\Delta\tau) = \left\{ \frac{d^2(t)}{d^2(t+\Delta\tau)} - 2A \right\} \overline{T}(t) + \frac{v^2(t+\Delta\tau)}{C\sigma\rho h_t h_0 (1+A)} \Delta\tau \qquad (7)$$

Where,
$\Delta\tau$ is time step of calculation; and
the approximation $$\frac{d^2(t)}{d^2(t+\Delta\tau)} = 1.0$$

is used because the time step $\Delta\tau$ is very small.
A is a heat loss term, where $$A \equiv \frac{2}{C\sigma} \left( \frac{\alpha_1}{2h_0} + \frac{\alpha_2}{d} \right) \Delta\tau; \text{ and} \qquad (8a)$$

Terms $\alpha_1$ and $\alpha_2$ are defined as follows:

$$\alpha_1 \overline{T} \equiv -K_e \frac{\partial T}{\partial z} \bigg|_{z=h} \qquad (8b)$$

$$\alpha_2 \overline{T} \equiv -K \frac{\partial T}{\partial r} \bigg|_{r=d/2} \qquad (8c)$$

Only heat loss term (A) which represents the heat loss from the target volume 94 needs to be determined to solve equation 7, and the heat loss term (A) can be determined by experimental measurements using test workpieces 26 having a reference total plate thickness $h_0$, as will be described. The other parameters C, σ, and ρ are constants representing physical properties used by the welding data processor 36. The constants are looked up in a physical property table or obtained from suppliers of the material used to fabricate the workpiece 26, or otherwise input to the controller 30.

Even though the mean weld temperature $\overline{T}$ is represented as a function of voltage v, the welding current waveform should be also measured to correct the magnetic flux effect in the cables on the measured voltage u in equation 5. Stated differently, the welding current I is measured in order to determine the corrected voltage v according to equation 5.

Figure 3B:
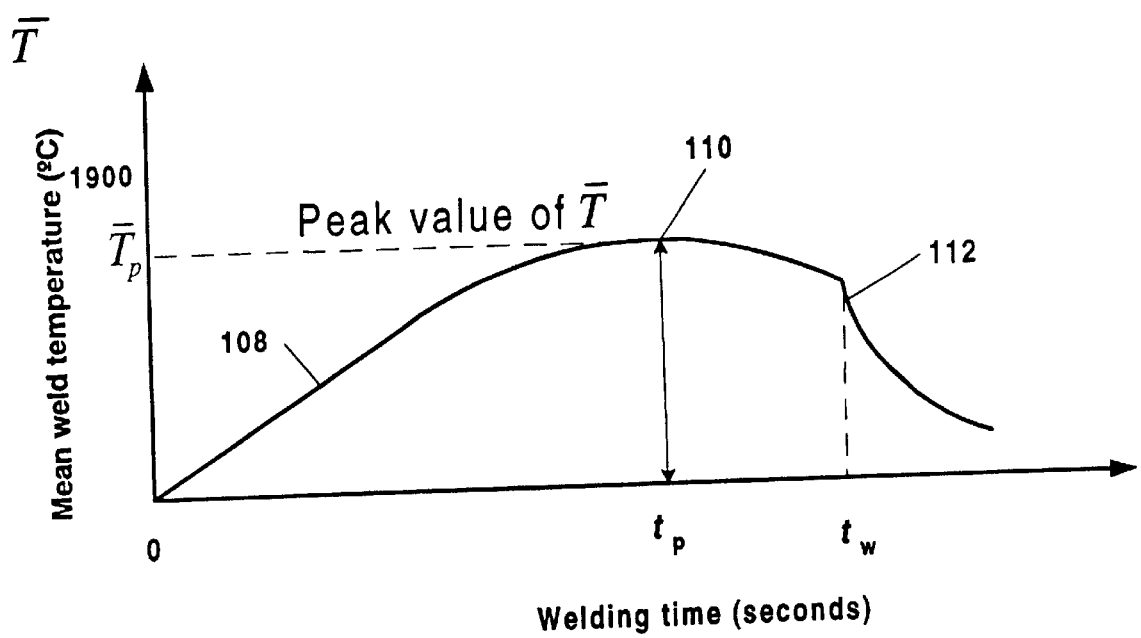
FIG. 3B is a graph of the mean weld temperature in the target volume of FIG. 3A during a welding operation.

Referring to FIG. 3B, curve 108 represents the mean weld temperature in target volume 94 during welding. The peak weld temperature $\overline{T}_p$ is reached at time $t_p$ 110 during a welding operation. As will be described below, the weld diameter is a function of $\overline{T}_p$ because the nugget diameter, defined as the maximum molten diameter in a weld, occurs at the peak weld temperature $\overline{T}_p$. The current flow is terminated at time $t_w$ 112.

Assuming that the peak value $\overline{T}_p$ of the mean weld temperature $\overline{T}_p$ is constant when splash occurs, the temperature for different contact conditions between electrode tips 66a, 66b and workpiece 26 should be the same regardless of the number welding operations on a set of electrode tips. The heat loss term (A) is determined experimentally based on this assumption.

One exemplary method to determine heat loss term (A) experimentally includes collecting welding parameter data for current values i below and above the welding current values which produce splash under normal welding conditions. Data is preferably collected using a new set of electrode tips 66a, 66b and the same electrode tips 66a, 66b which have been used for more than a thousand welding operations. After each workpiece 26 is welded, the workpiece 26 can be dismantled and the actual weld diameter in each workpiece 26 can be physically measured. This process results in separate data sets for the new and used electrode tips 66a, 66b.

After collecting the data, an iterative computational process initially sets the heat loss term (A) to 0.01. Using the experimentally collected data and the initial value of (A), the mean weld temperature profile is calculated from equation 7 so that the peak value $\overline{T}_p$ of mean weld temperature $\overline{T}_p$ at each critical splash current (i) is determined for each data set. The estimated peak value for the new electrode tips 66a, 66b is compared to a peak value for the used electrode tips 66a, 66b. If both values are not within a predetermined threshold, the heat loss term (A) is increased in 0.005 steps and the process repeated to find a sufficiently accurate estimation the heat loss term (A). This procedure determines the value of heat loss term (A) for a given material by minimizing the sum of errors of estimated peak mean weld temperature $\overline{T}_p$ for both sets of data.

Alternatively, an accurate value of heat loss term (A) for given materials can be determined by minimizing the sum of errors of the difference between the measured weld diameters obtained with new electrode tips 66a, 66b and those obtained with used electrode tips 66a, 66b. Curves showing the relationship between the mean weld temperature and the measured weld diameter for the both new and used electrode tips 66a, 66b will nearly overlap if the value of heat loss term (A) is optimized for the workpiece 26 materials.

Referring now to FIG. 4A, a general relationship between weld diameter and weld time for increasing current settings is shown. Curve 120 represents the weld diameter as a function of the total weld time. The weld time is the accumulated time during which current is flowing through the workpiece 26. The current flow occurs in successive relatively short cycles. The x-axis represents the accumulated weld time in seconds over a series of successive cycles. It will be appreciated by those of ordinary skill in the art that these curves can be determined experimentally and the values depend on the type of material being welded.

Point 122, on curve 120, indicates the time at which splash occurs for a given current setting. Typically the electrode force is held constant. Curve 124 represents the weld diameter as a function of the total welding time at a higher current setting than curve 120. Point 126 on curve 124 indicates that splash will occur sooner when a higher current setting is being used. The electrode tip 66a and 66b life (number of welding cycles) is approximately constant for both curves 120 and 124.

Referring to FIG. 4B, a general relationship between weld diameter and welding current for increasing number of weld cycles on a set of electrode tips is shown. Curve 130 represents the effective weld diameter as a function of the welding current. The effective welding current is the current flowing through the workpiece 26 during the series of welding cycles. These curves are determined experimentally and the values depend on the type of material being welded.

Point 132, on curve 130, indicates the current setting at which splash occurs for a relatively new electrode tip condition. Curve 134 represents the weld diameter as a function of the effective welding current where the electrode tips have been used for an increasing number of welding cycles. Point 136 on curve 134 indicates that splash occurs at a higher current setting on a set of worn electrode tips 66a and 66b. Typically the electrode force is held constant for these measurements. For example curve 130 could indicate the use of new electrode tips and curve 134 could represent the electrode tip after 2,000 to 3,000 welds for coated steel plates, and 5,000 to 10,000 welds for bare uncoated steel plates.

Referring now to FIG. 4C, a relationship between weld diameter and estimated weld temperature is shown. Curve 140 represents the weld diameter as a function of estimated mean temperature in the target volume 94 (FIG. 3A). Curve 140 is derived from experimental curves 120, 124, 130 and 134 (FIGS. 4A and 4B) and by estimating the mean temperature in the target volume 94 from equation 7 described above. A weld diameter of 5√h, where h is the plate thickness of the thinner sheet or plate forming the workpiece 26, indicates a typical minimum weld diameter. On curve 140, point 148 indicates the estimated mean temperature at which splash occurs. As has been determined experimentally, a hyperbolic or sigmoid function can approximate weld diameter as a function of mean weld temperature. For example curve 140 is approximated as a hyperbolic function of the mean temperature in the target volume 94 defined in FIG. 3A. The bulk properties of the workpiece are described by curve 140 and by the mean temperature at which the suggested minimum weld size occurs. The splash point is related to the surface condition of the workpiece.

A target temperature range 150 indicates a range of estimated target volume mean temperatures which will produce the weld diameter meeting the minimum size criteria without the occurrence of splash. The target temperature range 150 can change as the minimum weld diameter is changed. A lower point 146 of the target temperature range 150 is labeled "L" and the upper point 148 of the target temperature range 150 is labeled "U". At estimated temperatures above "U" splash can occur. During a welding operation, the estimated mean temperature of the weld can be calculated according to discrete welding controller code as described below in equations 12a and 12b in order to assure operation within the target range. Both target temperature values, "L" and "U" can be determined empirically as described below in conjunction with FIG. 4D.

Figure 4D:
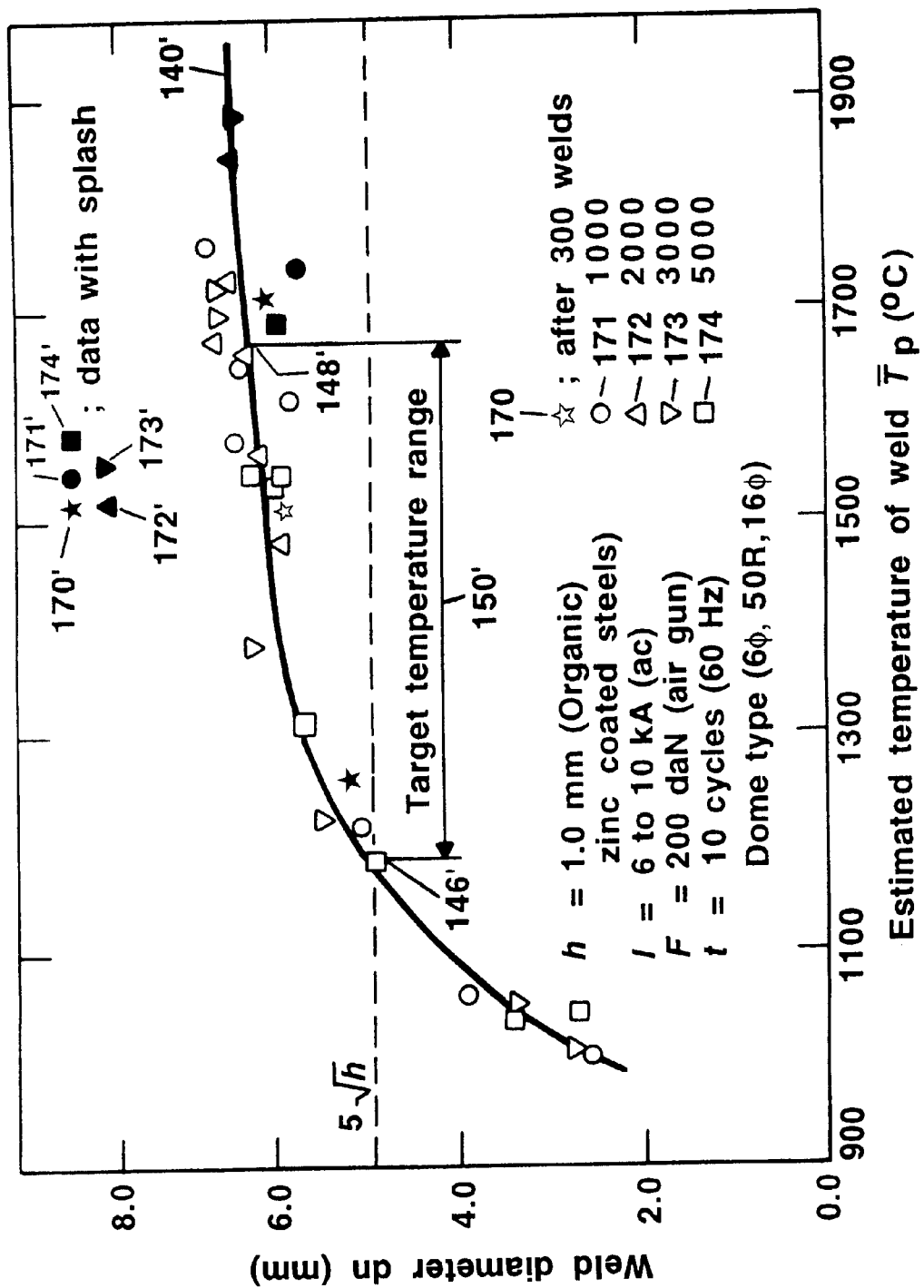
FIG. 4D is a graph showing the weld diameter for zinc coated steel as a function of the mean estimated temperature of a weld as predicted by the energy balance model of the present invention.

Referring now to FIG. 4D, the relationship between weld diameter d and the estimated temperature T of the weld is represented by curve 140' for organic zinc coated steel. A target temperature range 150' specifies temperatures which produces the suggested weld diameter of 5√h without the occurrence of splash. Data points 170–174 indicate the results after the indicated number of welds on a set of electrode tips without the occurrence of splash. Corresponding data points 170'–174' represent the results after the indicated number of welds with the occurrence of splash.

The upper target temperature "U" 148' is determined empirically by setting the welding conditions for parts to be welded including the standard weld time for the specific parts being tested, determining the lower target temperature "L" 146' to produce the minimum weld diameter and an initial value for upper target temperature "U" 148', and welding the test parts. If splash occurs during the welding operation, then "U" 148' is adjusted to a lower value. If no splash occurs, the welding current is increased to provide a higher target value for U, and the test is repeated. Weld diameters are measured by inspection of the welded parts.

The curve 140' is based on the energy balance model and experimental target data obtained as described above. Given the estimated weld temperature from FIG. 4D, the welding parameters can be controlled to keep the actual temperature within the target temperature range 150' as described below in connection with FIG. 5C.

The illustrative data shown in FIGS. 4A, 4B and 4D was obtained with an AC spot welding machine having a mounted pneumatic gun. Steel coated on one side with organic zinc were used to obtain the experimental data. The plate thickness was 1 mm, and two plates were stacked together. Electrode tips 66a, 66b were a domed type (spherical tip) and 16 mm in diameter. The experiments used large test plates (referred to as coupons) having a size of 300 mm×300 mm, the electrode force was set at 200 daN, 10 welding cycles were used, and the welding current was set at 8.0 kA. It will be appreciated by those of ordinary skill in the art, that the shape and frequency of the welding waveform can vary as a function of the power control unit 16.

The heat loss term (A) (equations 8a, 8b and 8c) is calculated so that the critical weld temperature value at which splash occurred after 300 welds was the same as that after 3000 welds. Data representing the values for different coated materials and plate thickness can be described in curves similar to curve 140' including target temperature ranges 150', and this data is used by the nugget diameter prediction processor 42 and the splash prediction processor 40 in the processes described below in conjunction with FIGS. 5A–5C.

Figure 5A:
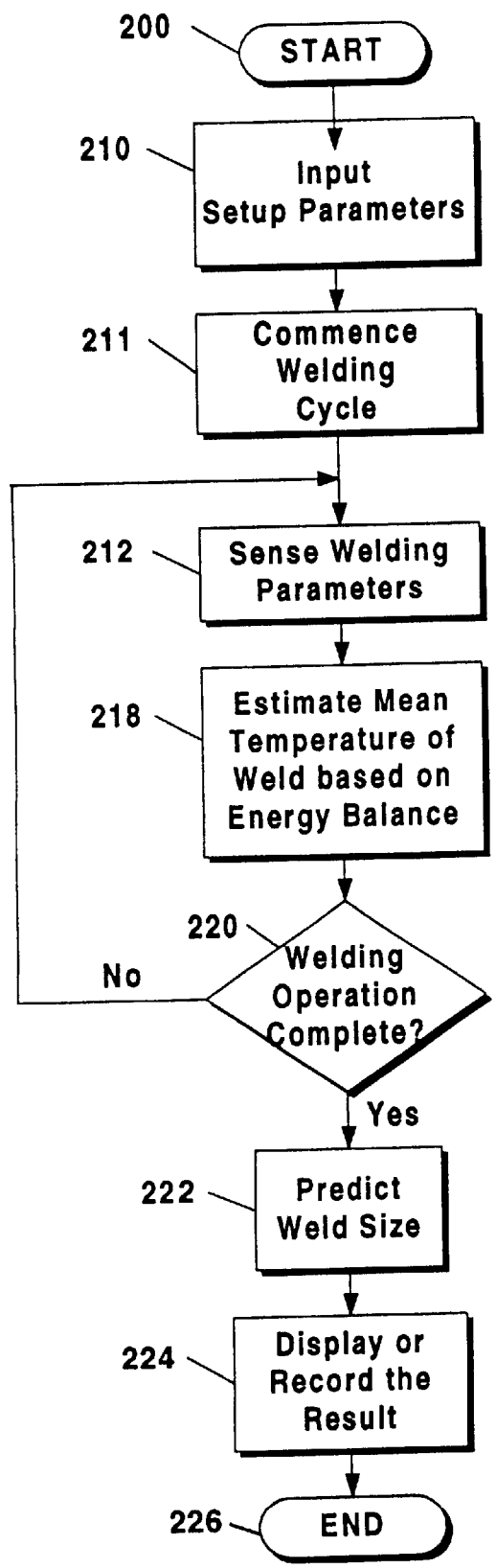
FIG. 5A is a flow diagram illustrating the steps used to monitor the weld diameter in a welding operation by using the energy balance model of the present invention.

Turning now to FIG. 5A, a flow diagram illustrates a process for monitoring the quality of a weld by predicting weld diameter based on the energy balance model. In the flow diagrams of FIGS. 5A–5C, the rectangular elements are herein denoted "processing blocks" (typified by element 210 in FIG. 5A) and represent computer software instructions or groups of instructions. The diamond shaped elements in the flow diagrams are herein denoted "decision blocks" (typified by element 220 in FIG. 5A) and represent computer software instructions or groups of instructions which affect the operation of the processing blocks. Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

The process commences in step 200, following which data about the welding operation to be performed is input into the welding machine controller 30 (FIG. 1) in step 210. The data can be manually input, input from a storage media, retrieved from a database 50 (FIG. 1) or downloaded from a network connected to a manufacturing system. The data includes information describing the workpiece 26 including total plate thickness $h_t$, configuration and physical properties (C, σ, ρ) of the workpiece 26 materials. Additional data includes the electrode tip resistance ($R_e$) and the mutual inductance (M) between the secondary circuit of welding machine and the measuring lead. Welding machine controller 30 setup includes setting welding parameters such as welding current ($I_{eff}$) which is a root mean squared value of the AC current, electrode force (F) and weld time ($t_w$) to run the welding machine 14.

In step 211, a welding cycle is commenced by the welding machine controller 30 (FIG. 1) signaling the force control unit 18 to activate the force actuator 22 to apply a force with the electrode 24 to the workpiece 26. Also, the power control unit 16 under control of the welding machine controller 30 initiates a welding current flow through the workpiece 26.

Data processing begins in step 212, in which welding parameters are measured by the welding data processor 36 (FIG. 1). In particular, the welding current I is measured by current sensor 72 (FIG. 2), integrated by integrator 74 and digitized by ADC 56 to provide the measured welding current 82 (FIG. 2) to the welding machine control processor 32 and the integral energy balance processor 34. The welding voltage u is measured across the electrodes 24 and 28 and digitized by ADC 56 to provide the measured welding voltage 80 to processors 32 and 34.

Optionally, the measured welding voltage 80 can be corrected for errors induced by the mutual inductance between welding current circuit and the voltage measuring cables. The measured voltage u is corrected in step 212 according to equation (5) to get the true welding voltage v between top and bottom surfaces of workpiece 26 by subtracting from the measured voltage u the voltage drops in the electrode tips 66a and 66b voltage drops and the voltage caused by the mutual inductance between the welding current circuit and the voltage pickup cables 68. The resistance drop in electrode tips 66a and 66b and the mutual inductance between welding current circuit and the voltage measuring circuit can be measured offline or determined from specifications.

A further optional correction to compensate for errors in the measured voltage can be applied in step 212 in order to reduce errors due to deformation in the electrode tips 66a and 66b over a useful life of several thousand welding cycles. Heat loss term "A" is optionally modified to compensate for an effect of the ratio of $d^2(t)/d^2(t+dt)$ described in equation 7 (i.e. an incremental change of contact diameter over time). The dynamic resistance R (welding voltage divided by welding current) is inversly proportional to the contact area. The ratio $d^2(t)/d^2(t+dt)$ can be calculated with the ratio R(t)/R(t+dt). The correction to "A" is determined experimentally by plotting contact diameter variation under conditions of low and high welding current without splash and relating those values to the maximum value of a dynamic resistance curve to determine the correction factor. For example, the modified value of "A" will increase slightly if the contact diameters increase as the tips age (increasing weld number). The modification is useful to improve the accuracy of the mean temperature calculation when the voltage drops in the electrode tips change due to varying contact diameters between the electrode tips 66a, 66b and the workpiece 26.

In step 218, an estimated mean temperature of the weld is computed based on the energy balance model as expressed in equation 7. Stated differently, the energy balance equation 1 is used to derive the discrete iteration of equation 7 with which the mean temperature estimated. The calculation is preferably executed in the idle loop (foreground task loop) of the welding machine control processor 32. The estimation integrates the energy input into the target volume 94 and subtracts the heat lost from the workpiece 26 using the heat loss term (A) given in Equation (8a). The heat loss term (A) in equation 7 is preferably simplified by assuming that the contact diameter (d) does not change much from one sampling interval to the next, providing the approximation, $d(t)/d(t+\Delta\tau)=1.0$, because the interval is very short.

In step 220, it is determined whether the welding operation is complete by comparing the set welding time as input in step 210 to the elapsed welding time. If the elapsed time has not exceeded the set time, the welding process is continued by sensing welding parameters again in step 212.

In one embodiment, steps 212–220 are combined into welding controller codes which are executed on the welding machine control processor 32. The controller codes iteratively calculate a corrected welding voltage and a temperature in the target volume 94 as a function of the corrected voltage. This process effectively integrates the energy input into the target volume 94 (FIG. 3A). This embodiment is described in more detail below in equations 12a and 12b which are based on equation 7 as modified with the approximation $d(t)/d(t+\Delta\tau)=1.0$. The calculation of the estimated temperature in the target volume 94 is simplified to provide the temperature as a function of the previous temperature in the target volume and the square of the corrected voltage which represents the energy being supplied to the target volume 94. The heat loss is represented by two parameters, which are a function of heat loss term (A) and the total plate thickness ($h_t$) of the workpiece.

Alternatively, the data for a complete welding operation are captured at step 212' (not shown), stored and latter recalled. Next, the energy balance and the estimate of maximum mean temperature of the target volume during welding is calculated in a single step 218' (not shown). This procedure is applicable welding machine controllers with limited CPU processing power. In the alternative procedure, step 220 is not required.

In step 222, the weld diameter is predicted using the maximum value of the mean temperature during welding and approximating the weld diameter as a function of temperature based on a curve similar to curve 140' in FIG. 4D derived during training.

In one embodiment, a weld diameter (Dmelt) is calculated by:

$$Dmelt(I)=DNmax*TanhP((MTMP(I)-TempBS)/CoeffTW)$$

Where,
Dmelt is the estimated weld diameter of the weldment;
DNmax is a maximum diameter determined experimentally as a parameter for the estimation;
Tanhp is a hyperbolic tangent function used to estimate the weld diameter as a function of mean weld temperature as described above in conjunction with curve 140' (FIG. 4D);
MTMP is a mean temperature in the target volume 94;
TempBS is an offset value to fit the TanhP function; and CoeffTW is a coefficient to fit the TanhP function.

This process for predicting weld diameter is a software implementation to calculate a weld diameter by determining a weld diameter corresponding to a mean temperature in the target volume 94 from a curve similar to curve 140' (as shown in FIG. 4D). The curve is estimated with a hyperbolic tangent function with an offset value TempBS and coefficient CoeffTW calculated using experimental data. The hyperbolic tangent function can be replaced with similar functions (e.g. a sigmoid function as used for neural networks). DNmax is set to the suggested minimum weld size ($d_{n,req}$), a manufacturer's recommendation, or an approximation such as 5√h or 4√h where h is a workpiece plate thickness.

In step 224, the values representing the predicted weld diameter and the estimated mean temperature are displayed on the status and display indicators 46 or recorded for later use. If the temperature thresholds L and U are entered at step 210 as setup parameters, the occurrence of splash, and the size of weld (also referred to as the grade of the weld) can be displayed in addition to the estimated weld diameter. The process terminates at step 226. It will be appreciated by those of ordinary skill in the art, that there are additional phases in a welding operation such as the initial period where the electrodes 24 and 28 are applying force to the workpiece 26 before any current flows (referred to as the squeeze time) and the period after the current flow has been halted and the electrodes 24 and 28 are still are applying force to the workpiece 26 (referred to as the hold time) which are not shown in the flow diagrams of FIGS. 5A–5C.

Figure 5B:
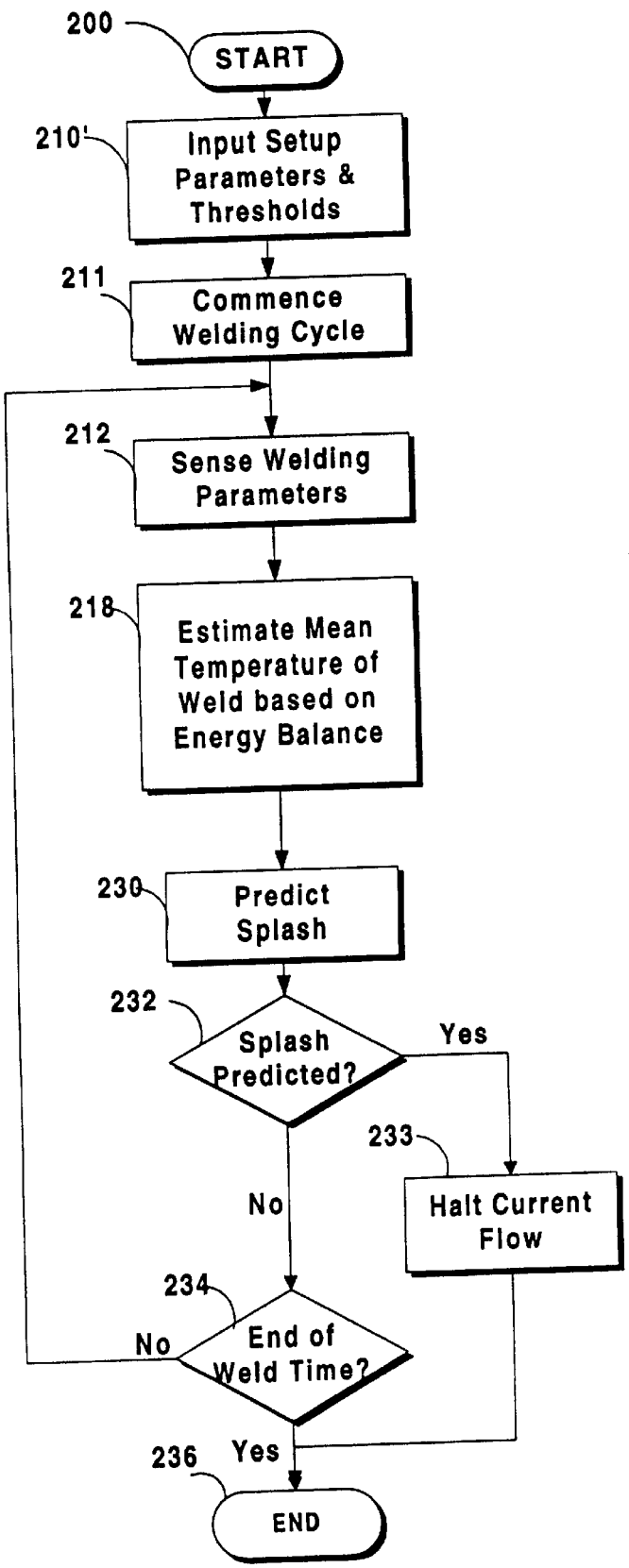
FIG. 5B is a flow diagram illustrating the steps used to predict and eliminate the occurrence of splash by using the energy balance model of the present invention.

Turning now to FIG. 5B, a flow diagram shows a process for eliminating the occurrence of splash during a welding operation using the energy balance model. Steps 200–218 are similar to the like numbered steps described in conjunction with FIG. 5A. Step 210' varies from corresponding step 210 in FIG. 5A in that the upper endpoint U of the target temperature range (FIGS. 4C, 4D) is required as an additional input to eliminate the splash using the process of FIG. 5B. The factors for approximating the weld diameter are not needed in the process of FIG. 5B.

In step 230, the estimated mean temperature of the target volume 94 for the next cycle is compared to the upper limit U of target temperature range. The mean temperature is predicted for the next weld cycle assuming that the welding voltage is constant over the next cycle. Typically, an AC welding controller can only control the welding current on a complete one cycle period. If supported by the welding controller, control can occur over a one half cycle interval.

In step 232 it is determined whether the predicted mean weld temperature in the target volume 94 is higher than the upper limit U of the target temperature range. If the predicted mean weld temperature is higher than the upper limit U, thereby predicting the occurrence of splash, the current flow is halted in step 233 and the process ends at step 236.

Alternatively, if no splash is predicted, a test is performed at step 234 to determine if the welding operation is complete by comparing the set welding time with the elapsed weld time. If the welding operation is not complete, then the process is repeated at step 212. Alternatively the process ends at step 236.

Figure 5C:
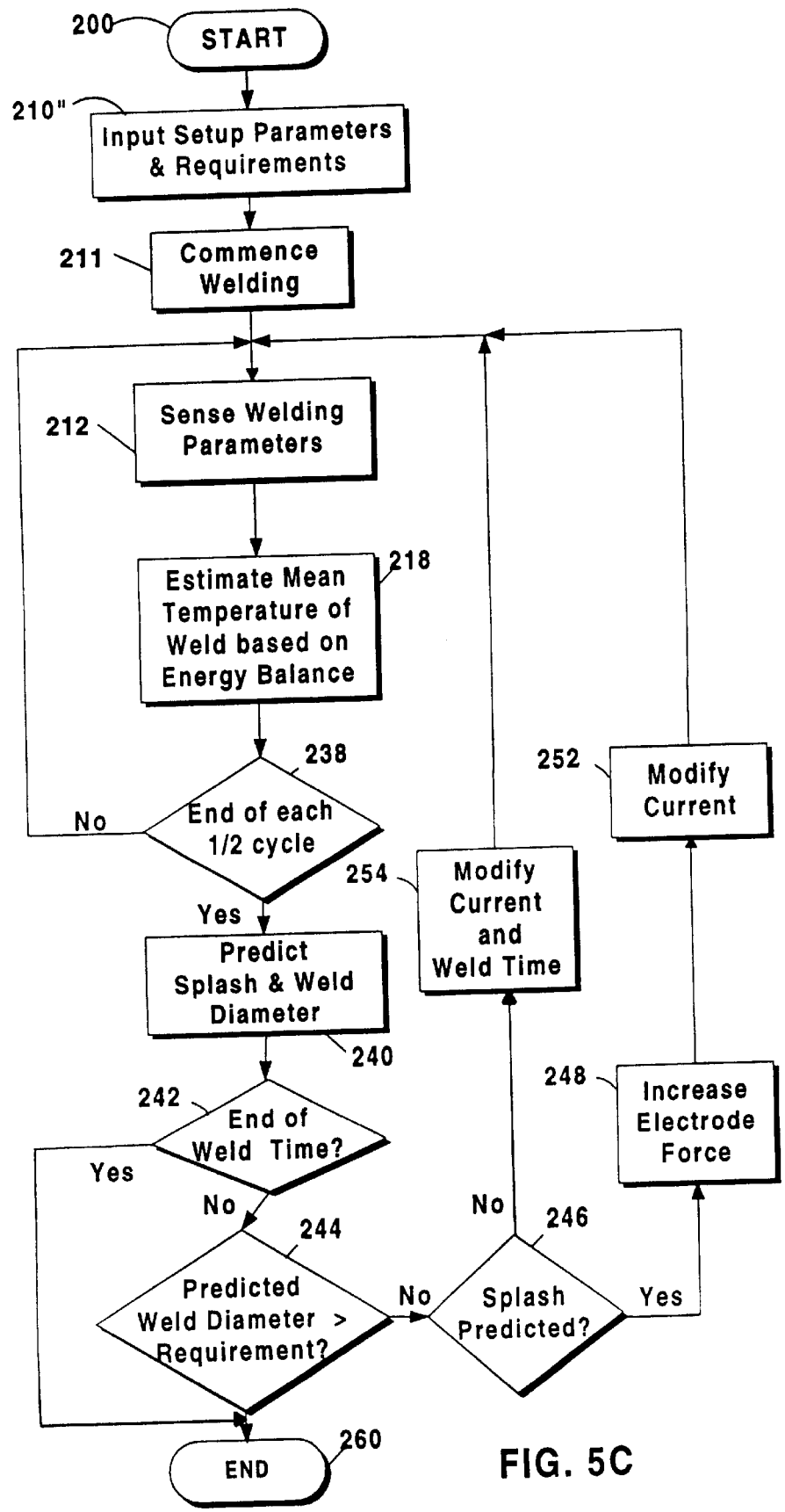
FIG. 5C is a flow diagram illustrating the steps used to adaptively control a welding operation to produce a weld having at least a minimum weld diameter without splash by using the energy balance model of the present invention.

Turning now to FIG. 5C, a flow diagram shows a process for providing a total quality assurance system by adaptively modifying the welding parameters during welding cycles using the energy balance model. Steps 200–218 are identical to the like numbered steps described in conjunction with FIG. 5B. Step 210" varies from corresponding step 210' in FIG. 5B in that the lower endpoint L of the target temperature range (FIGS. 4C, 4D), which is determined by the required minimum weld diameter $d_{n,req}$ is required as an additional input to guarantee the weld diameter.

If in step 238, it is determined that a one half weld cycle has not been completed, the welding process continues by continuing to sense welding parameters in step 212. This step reduces the computational load because typically splash control is effective on a one half cycle interval because the current flow can typically only be halted on a full cycle boundary in welding controllers having single phase AC power sources. The estimated mean weld temperature in target volume 94 (FIG. 3A) is then iteratively updated according to equation 7 in steps 212–218 until the next welding one half cycle is complete. If a one half cycle has been completed, processing continues at step 240. The one half cycle optimization generally applies when an AC power source is used. If a controller can control the current flow more quickly, steps 240–256 can be executed more frequently to provide more responsive control.

In step 240, it is determined whether the predicted mean weld temperature in the target volume 94 (FIG. 3A) is within the target temperature range. The predicted mean weld temperature values can be used to predict a mean temperature profile in the target volume and to predict a corresponding growth in the weld diameter. If the predicted mean weld temperature is higher than the lower limit L and lower than the upper limit U, then a sufficient weld diameter will be formed without splash. If the predicted mean temperature for the next cycle is higher than the upper limit U, the occurrence of splash is predicted. If the predicted mean weld temperature is lower than the lower limit L, an insufficient weld size is predicted. It is assumed that the welding voltage is constant over the next cycle. The predicted mean temperature at the end of the next cycle is calculated by iterating equation 7 over the next welding cycle. The upper limit U of the target temperature range is compared to the predicted mean temperature to predict the occurrence of splash during the next cycle. If supported by the welding controller, control can occur over a half cycle interval.

In step 242, it is determined whether the welding operation is complete by comparing the set welding time to the elapsed welding time. If the elapsed time has not exceeded the set time, the welding process is continued at step 244. Alternatively, if it is determined that the weld has exceeded the set time the welding operation terminates at step 260.

In step 244 it is determined from the weld diameter prediction in step 240 whether the estimated mean weld temperature is higher than the lower limit L of the target temperature range. If the estimated mean weld temperature is higher than the lower limit L thereby predicting a sufficient weld size, processing terminates at step 260. Alternatively, if insufficient weld diameter is predicted in step 244, adaptive control is used to modify the welding process. Processing resumes at step 246 to make a determination if the occurrence of splash is predicted. It will be appreciated by those of ordinary skill in the art that in many welding controllers using AC power, the current cannot be halted instantaneously and that current will continue to flow until the end of a cycle.

In step 246, it is determined from the predicted mean weld temperature for the welding cycle whether splash will occurs in that cycle without changing welding parameters. Splash is predicted if the predicted mean weld temperature is higher than the upper limit U of the target temperature range. If splash is predicted, processing continues at step 248, otherwise processing continues at step 254.

In step 248, the electrode force is increased by an amount ΔF to prevent the occurrence of splash. The increment of electrode force ΔF is calculated with the following:

$$T(t) = \frac{4}{C\sigma h_t} \int_0^t \left\{ \frac{I^2}{F\pi d_c^2} \rho h_t A \sigma_Y f(d_c/h) + \frac{d^2}{2d_c^2} K_e \frac{\partial T}{\partial z} + \frac{h_t d}{d_c^2} K \frac{\partial T}{\partial r} \right\} d\tau \quad (9)$$

Where:
I is the welding current;
F is a setup value for electrode force; and
$\sigma_Y$ is the flow stress/yield stress of workpiece. Equation 9 assumes that the plates have the same thickness, but it will be appreciated by those of ordinary skill in the art that the equation can be modified for different plate configurations.

Equation 9 expresses a mean temperature rise of weld at time t under a given electrode force condition, which is derived by describing the contact diameter as a function of electrode force. Equation 9 is combined with equation 4 above to yield:

$$\Delta F = \beta_1 \cdot \Delta R \cdot F/R \quad (10)$$

Where:
R is a reference value of resistance between electrode tips;
$\Delta R$ is a deviation of measured resistance between electrode tips from the reference value;
F is a setup electrode force value; and
$\beta_1$ is a coefficient to improve the control stability.

The adaptive control processor 44 (FIG. 1) increases the electrode force in accordance with the above equation. The details of adaptively controlling splash are described in "A Study Of Splashing Mechanism In Resistance Spot Welding," Matsuyama and Chun, Proceedings of Sheet Metal Welding Conference IX, October, 2000.

In step 252, if after increasing electrode force in step 248, it is determined that the increase in electrode force is not sufficient to control the predicted splash, the current is reduced so that the peak mean temperature value remains below the threshold. The welding voltage will change as a result of the change in electrode force. The process continues at step 212.

In step 254, the current and the weld time are modified in response to the temperature profile if required to assure a sufficient weld diameter when the welding operation terminates. If the mean temperature is rising during welding, the predicted deviation in weld diameter can be compensated by increasing weld time and modifying welding current. In the saturated stage, when the mean temperature has reached the peak maximum value, only the current is modified and the weld time is not increased. The product of the increment of the current squared and the remaining welding current flow time increment can be calculated with the following equation:

$$\Delta I^2 \Delta t_w = \beta_2 \cdot \Delta \bar{T} \quad (11)$$

Where:
$\Delta I$ is an increment of welding current I;
$\Delta t_w$ is the remaining time during which weld current will flow through workpiece 26;
$\Delta \bar{T}$ is a deviation of estimated mean weld temperature from reference value; and
$\beta_2$ is a constant.

Equation 11 is derived from the first term of equation 9 above. During the period when the mean weld temperature is rising, the product of current $\Delta I^2$ and time $\Delta t_w$ can be determined depending on the degree of the saturation of the mean weld temperature. The modifications to current and weld time occur every one cycle of welding current flow because each half cycle of welding current conduction cannot be controlled once the current contactor switch turns on due to use of silicon controlled rectifier (SCR) devices to control AC or single DC power sources. A middle frequency DC power source can be controlled with a finer time resolution because the switching rate is higher than almost 1 kHz.

During the period when the mean weld temperature is rising, the product of current $\Delta I^2$ and time $\Delta t_w$ can be determined depending on the degree of the saturation of the mean weld temperature. The modifications to current and weld time occur every one cycle of welding current flow because the welding current flow start time cannot be controlled to a resolution less then one cycle when using AC power source. However, there is no cycle control restriction when using a middle frequency DC power source.

These modifications are preferably executed in the idle loop (foreground task loop) of the welding machine control processor 32. Processing continues at step 212 after making the modifications.

In step 254, if the predicted mean temperature saturates before the end of the welding operation and the saturated mean temperature value is lower than the threshold L (FIG. 4D) required for the minimum weld diameter, only the current is modified. If the predicted mean temperature will not saturate by the end of the preset weld time and the saturated temperature will be greater than the threshold value L at some time after the preset weld time duration and thus sufficient for the required weld diameter, the weld time $t_w$ is increased to assure the required weld diameter.

In one embodiment, the integral energy balance processor 34, the temperature prediction processor 38 is implemented on an conventional resistance spot welding system by means of additional control codes executed on the welding machine control processor 32. The improved welding controller code calculates the estimated mean temperature at each scanning interval $\Delta \tau$ (scanning cycle number I) in the welding operation. The following exemplary software codes based on equations 5 and 7 are implemented to iteratively calculate the welding voltage and estimated mean temperature of the weld:

$$volt(I+1) = voltm(I+1) - cur(I+1)*Rtip - M*(cur(I+1) - cur(I))/\Delta \tau \quad (12a)$$

$$Temp(I+1) = C1*Temp(I) + C2*volt(I+1)**2/thickness(I+1) \quad (12b)$$

Where:
I is the scanning cycle number;
voltm(I) is the measured welding voltage;
cur(I) is the measured welding current;
$\Delta \tau$ is the scanning interval between each capturing data (typically, 1/2400 s);
volt(I) is the corrected welding voltage for the iteration;
thickness(I) is the measured or given data of total plate thickness;
Rtip is the combined resistance drop in both electrode tips;
M is the mutual inductance to reduce the inductive effect on the voltage, (predetermined depending on the voltage measuring circuit); and
Temp(I) is the modified weld temperature defined in equation (7).
C1, C2 are constants that depend on the materials welded and sampling rate.

$$C1 \equiv \frac{d^2(t)}{d^2(t+\Delta\tau)} - 2A, \quad C2 \equiv \frac{\Delta\tau}{C\sigma\rho h_0(1+A)} \quad (13)$$

Where:

t is the time of each scanning and integration step in step 218 of FIGS. 5A–5C.

$\Delta\tau$ is the scanning interval (typically $1/2400$ s):

$h_0$ is the reference total plate thickness used in the training with test data;

and the calculation of C1 is simplified by assuming that $d(t)/d(t+\Delta\tau)=1.0$ as discussed above.

The estimated mean temperature calculation routine is uncomplicated because it is based on the energy balance model in integral form with the assumptions described above to simplify the calculations. The sensing and control program can be implemented by adding the above programs codes within a loop for an ADC data capture program in the welding data processor 36 or in an idle loop in the control program of the welding machine control processor 32.

Figure 6:
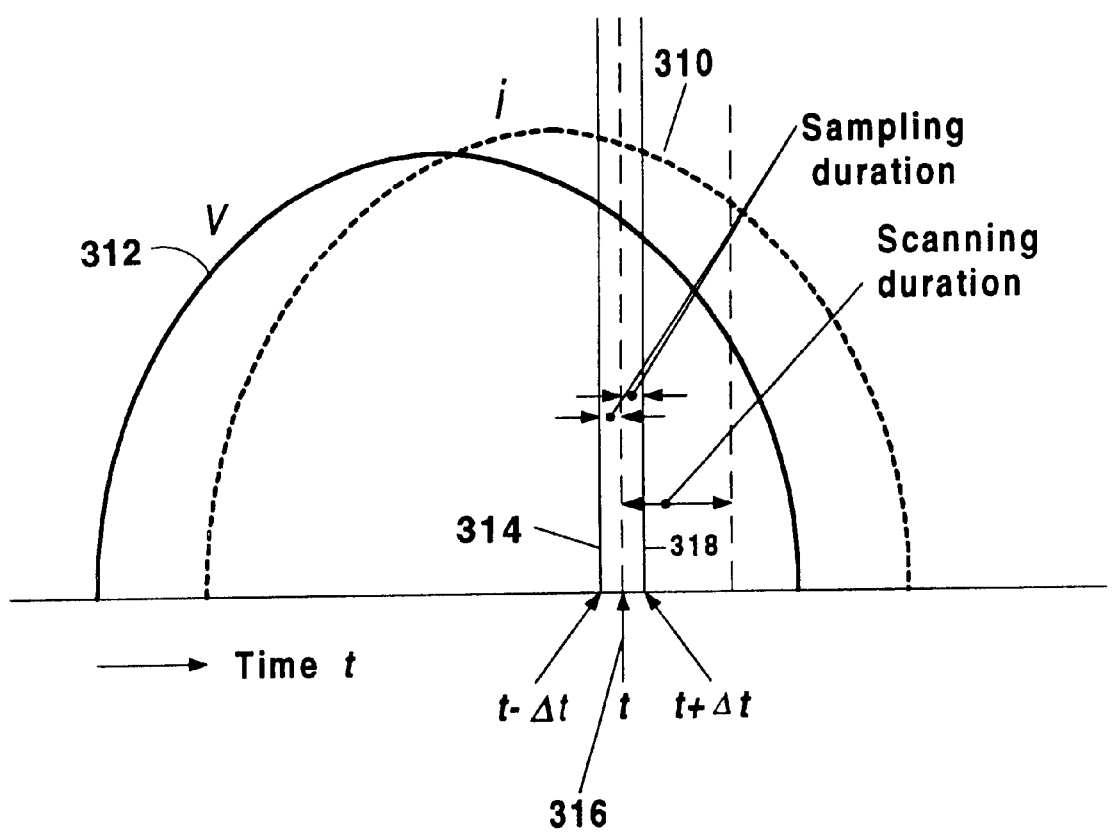
FIG. 6 is a timing diagram illustrating a procedure to approximate the resistivity of a workpiece using a multiplexed analog to digital converter.

Referring now to FIG. 6, curve 310 represents the welding current and curve 312 represents the welding voltage. By the selection of sampling times 314–318 an alternate technique is provided for approximating an accurate resistance of the workpiece 26 as a function of simultaneously captured welding current and voltage during a half cycle in the welding process. Conventionally, an expensive analog-to-digital converter with simultaneous sampling circuits for multi-input channels is used to capture welding current and voltage simultaneously.

In one embodiment of the present invention, an accurate approximation of simultaneously measuring the welding current and voltage can be realized with a low cost progressive type of analog-digital converter having a three channel input multiplexer to capture voltage and current monitoring data. FIG. 6 shows the value of the welding voltage v being sampled at time t 316, and the welding current being sampled at time t-$\Delta$t 314 and t+$\Delta$t 318. The current measurements are averaged to provide a mean value. The resistance (r) of the workpiece (26) is thus calculated according to the following equation:

$$r(t) \equiv \frac{2 \cdot v(t)}{i(t-\Delta t)+i(t+\Delta t)} \quad (14)$$

Where:

$\Delta$t is the sampling interval between each channel (typically $1/30000$ second).

The measurement is accurate because the current curve is almost linear for a very short duration under the high rate sampling conditions of resistance spot welding. The averaged current value captured before and after capturing the voltage value is used as the current value measured at the same time that the voltage is sampled. The resistance value approximated by using two current measurements and one voltage measurement as described above is within 0.05% of the resistance value computed from simultaneous voltage and current measurement performed by using a conventional high rate sampling circuit. The monitoring procedure can be applied to correct the inductive effect by the mutual inductance with equation 12a after sampling all three values.

The welding voltage can be approximated with the above-described resistance approximation by the following:

$$volt(I+1) = voltm(I+1) - 0.5*((cur(I+1,2)+cur(I+1,1))*Rtip - M*(cur(I+1,2)-cur(I+1,1))/2\Delta t) \quad (15)$$

Where:

cur(I, J) is the measured welding current using the approximation described above resulting in the current measurement being averaged over two samples (cur(I+1,1), cur(I+1,2)) measured by the alternate technique.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method for monitoring a resistance spot welding process performed on a workpiece having a target volume comprising the steps of:

monitoring at least one welding parameter; and computing a mean temperature estimate based on an energy balance model which includes said at least one welding parameter and a thickness of said workpiece.

2. The method of claim 1 further comprising the step of predicting a process condition associated with said resistance spot welding process based on said mean temperature estimate.

3. The method of claim 2 wherein the step of predicting a process condition comprises at least one of:

predicting an occurrence of splash;

predicting a weld diameter;

predicting a growth in the weld diameter; and predicting an electrode contact diameter.

4. The method of claim 3 wherein said splash predicting step comprises:

comparing said mean temperature estimate to a threshold temperature value; and predicting the occurrence of splash in response to said mean temperature estimate exceeding said threshold temperature value.

5. The method of claim 3 wherein said weld diameter predicting step comprises:

experimentally generating a function relating a weld diameter to a mean temperature in said target volume; and using said function to determine said weld diameter in response to said mean temperature estimate.

6. The method of claim 2 further comprising the step of controlling at least one welding parameter in real time in response to said predicted process condition.

7. The method of claim 1 wherein said energy balance model further includes a target volume heat loss term.

8. The method of claim 7 wherein an approximation of said heat loss term is determined experimentally.

9. The method of claim 7 wherein said heat loss term is a function of the thickness of said workpiece.

10. The method of claim 1 wherein said energy balance model is a function of:

a welding voltage across the workpiece (v);

a heat conductivity constant in an electrode tip ($K_e$);

a heat conductivity constant in the workpiece (K);

a contact diameter at a plate-electrode interface at a time t (d);

a current density correction factor (f(d/h));

a temperature (I) in the target volume at a time $\tau$; and a total workpiece thickness ($h_t$).

11. The method of claim 10 wherein said energy balance model corresponds to:

$$Q = \int_0^t \left( v \cdot i \cdot f(d/h) + 2K_e \frac{\partial T}{\partial z} \pi d^2/4 + \pi d h_t K \frac{\partial T}{\partial r} \right) d\tau$$

Where:
Q is the amount of heat contained in the target volume;
t and τ are time;
r is a radius direction; and
z is a workpiece thickness direction.

12. The method of claim 10 further comprising the step of computing a real time estimate of said contact diameter at a plate-electrode interface (d) based on a resistance value calculated from the welding voltage v and a welding current i, a resistivity of the workpiece, the total workpiece thickness, and the current density correction factor.

13. The method of claim 1 wherein said mean temperature estimate is a function of heat (Q) in said target volume, a specific heat of a workpiece (C), a density of the workpiece (σ), and a resistivity of the workpiece (ρ).

14. The method of claim 13 wherein said mean temperature estimate is given by:

$$T_{Mean}(t) = \frac{Q}{h_t C \sigma \pi d_c^2 / 4}.$$

15. The method of claim 1 wherein said monitoring step includes monitoring at least one of a welding voltage and a welding current.

16. The method of claim 1 further comprising the step of defining said target volume as being bounded by a surface of a first electrode in contact with said workpiece and a surface of a second electrode in contact with said workpiece.

17. The method of claim 1 further comprising:
providing an analog-digital converter having an input multiplexer having at least three channels;
sampling a welding current to obtain a first welding current value;
sampling a welding voltage;
sampling the welding current to obtain a second welding current value; and
averaging the first and the second welding current values to approximate a resistive component value between a first electrode tip and a second electrode tip.

18. A resistance spot welding system comprising a power control unit and a force control unit, and a spot welding machine providing a welding parameter to a welding data processor during a welding operation in which a weld is formed in a workpiece having a target volume, said system comprising:
a weld temperature prediction processor operable to predict a mean temperature in said target volume using at least one welding parameter and a thickness of said workpiece, wherein at least one condition associated with said welding operation is predicted during the welding operation in response to said mean temperature prediction.

19. The system of claim 18 wherein said at least one process condition is one of an occurrence of splash, a weld diameter, a growth in the weld diameter, and a contact diameter.

20. A resistance spot welding system comprising a welding controller coupled to a welding machine for controlling a welding process performed on a workpiece comprising:
a welding data processor having an output port and an input port coupled to said welding machine; and
an energy balance processor having an input port coupled to said welding data processor output port to receive welding process data, wherein said energy balance processor is operative to calculate an estimate of the amount of energy in a target volume in response to said welding process data.

21. The controller of claim 20 wherein the integral energy balance processor is responsive to a thickness of said workpiece for calculating said estimate.

22. The controller of claim 20 further comprising a weld temperature prediction processor coupled to said welding data processor for predicting a temperature in a target volume of said workpiece.

23. The controller of claim 20 further comprising a nugget diameter prediction processor coupled to said weld temperature prediction processor for predicting a nugget diameter in said workpiece in response to said mean temperature prediction.

24. The controller of claim 20 further comprising an adaptive control processor coupled to said weld temperature prediction processor for adaptively controlling said welding process in response to said mean temperature prediction.

25. The controller of claim 24 wherein said adaptive control processor modifies at least one of a welding current, a welding time, and an electrode force.

26. The controller of claim 20 further comprising a splash prediction processor coupled to said weld temperature prediction processor for predicting the occurrence of splash in response to said mean temperature prediction.

* * * * *

UNITED STATES PATENT AND TRADEMARK OFFICE
CERTIFICATE OF CORRECTION

PATENT NO.     : 6,506,997 B2
DATED          : January 14, 2003
INVENTOR(S)    : Kin-ichi Matsuyama It is certified that error appears in the above-identified patent and that said Letters Patent is hereby corrected as shown below:

Column 3,
Line 46, delete "value a" and replace with -- value, a --.

Column 4,
Line 21, delete "predict of" and replace with -- predict --.

Column 5,
Line 15, delete "EMBODIENTS" and replace with -- EMBODIMENTS --.

Column 6,
Line 59, delete "part of welding" and replace with -- part of the welding --.

Column 7,
Line 57, delete "into an digital" and replace with -- into a digital --.

Column 8,
Line 52, delete "to a" and replace with -- to as --.

Column 9,
Line 20, delete "is as a" and replace with -- is a --.

Column 10,
Line 6, delete "used predict" and replace with -- used to predict --.
Line 60, delete "ho" and replace with -- $h_o$ --.
Line 62, delete "as product" and replace with -- as a product --.

Column 11,
Line 7, delete "which used" and replace with -- which is used --.
Line 26, delete "is time" and replace with -- is the time --.
Line 40, delete "Terms" and replace with -- terms --.

Column 12,
Line 34, delete "process repeated" and replace with -- process is repeated --.
Line 66, delete "tip" and replace with -- tips --.

UNITED STATES PATENT AND TRADEMARK OFFICE
CERTIFICATE OF CORRECTION

PATENT NO. : 6,506,997 B2
DATED : January 14, 2003
INVENTOR(S) : Kin-ichi Matsuyama It is certified that error appears in the above-identified patent and that said Letters Patent is hereby corrected as shown below:

Column 13,
Line 2, delete "increasing number" and replace with -- increasing the number --.
Line 62, delete "produces" and replace with -- produce --.

Column 14,
Line 20, delete "that," and replace with -- that --.
Line 21, delete "were" and replace with -- was --.

Column 15,
Line 46, delete "between welding" and replace with -- between the welding --.

Column 16,
Line 41, delete "are" and replace with -- is --.
Line 41, delete "latter" and replace with -- later --.
Line 45, delete "applicable welding" and replace with -- applicable to welding --.

Column 17,
Line 28, delete "are still are" and replace with -- are still --.

Column 18,
Line 59, delete "occurs" and replace with -- occur --.

Column 19,
Line 9, delete "of workpiece" and replace with -- of the workpiece --.

Column 20,
Line 16, delete "using AC" and replace with -- using an AC --.
Line 36, delete "on an" and replace with -- on a --.

Column 21,
Line 8, replace with " $\frac{1}{2400}$ s):" and replace with -- $\frac{1}{2400}$ s); --.
Line 10, delete "data;" and replace with -- data; and --.
Line 11, delete "and the" and replace with -- the --.

UNITED STATES PATENT AND TRADEMARK OFFICE
CERTIFICATE OF CORRECTION

PATENT NO. : 6,506,997 B2
DATED : January 14, 2003
INVENTOR(S) : Kin-ichi Matsuyama It is certified that error appears in the above-identified patent and that said Letters Patent is hereby corrected as shown below:

<u>Column 22</u>,
Line 66, delete "temperature (I)" and replace with -- temperature (T) --.

Signed and Sealed this

Ninth Day of September, 2003

JAMES E. ROGAN
*Director of the United States Patent and Trademark Office*